US011001048B2

(12) United States Patent
Orange

(10) Patent No.: US 11,001,048 B2
(45) Date of Patent: May 11, 2021

(54) METHOD OF THREE-DIMENSIONAL PRINTING USING A MULTI-COMPONENT BUILD POWDER

(71) Applicant: The ExOne Company, North Huntingdon, PA (US)

(72) Inventor: Michael J. Orange, Latrobe, PA (US)

(73) Assignee: The ExOne Company, North Huntingdon, PA (US)

( * ) Notice: Subject to any disclaimer, the term of this patent is extended or adjusted under 35 U.S.C. 154(b) by 1271 days.

(21) Appl. No.: 15/107,523

(22) PCT Filed: Dec. 17, 2014

(86) PCT No.: PCT/US2014/070732
§ 371 (c)(1),
(2) Date: Jun. 23, 2016

(87) PCT Pub. No.: WO2015/100084
PCT Pub. Date: Jul. 2, 2015

(65) Prior Publication Data
US 2016/0318252 A1 Nov. 3, 2016

Related U.S. Application Data

(60) Provisional application No. 61/919,845, filed on Dec. 23, 2013.

(51) Int. Cl.
*B22F 3/11* (2006.01)
*B29C 71/02* (2006.01)
*B33Y 80/00* (2015.01)
*B33Y 10/00* (2015.01)
*B29C 64/153* (2017.01)
*B22F 3/26* (2006.01)
*B22F 10/00* (2021.01)
*B29C 64/165* (2017.01)
*C22C 33/02* (2006.01)
*B33Y 70/10* (2020.01)
*B22F 1/00* (2006.01)
*B29C 67/20* (2006.01)
*B29K 103/04* (2006.01)
*B29K 103/06* (2006.01)
*B29K 505/00* (2006.01)
*B29K 507/00* (2006.01)

(52) U.S. Cl.
CPC ............ *B33Y 80/00* (2014.12); *B22F 1/0003* (2013.01); *B22F 3/114* (2013.01); *B22F 3/26* (2013.01); *B22F 10/00* (2021.01); *B29C 64/153* (2017.08); *B29C 64/165* (2017.08); *B29C 67/205* (2013.01); *B33Y 10/00* (2014.12); *B33Y 70/10* (2020.01); *C22C 33/0207* (2013.01); *B22F 2998/10* (2013.01); *B29K 2103/04* (2013.01); *B29K 2103/06* (2013.01); *B29K 2505/00* (2013.01); *B29K 2507/00* (2013.01); *C22C 33/0242* (2013.01); *C22C 33/0285* (2013.01); *Y02P 10/25* (2015.11)

(58) Field of Classification Search
CPC ....... B28B 1/001; B28B 1/008; B22F 1/0003; B22F 3/008; B22F 3/11; B22F 3/114; B22F 3/26; B29C 64/165; B29C 67/205; B29C 71/02; B29K 2103/04; B29K 2103/06; B33Y 10/00; B33Y 70/10; C22C 33/0207; C22C 33/0242; C22C 33/0285
USPC ...... 264/113, 125, 126, 128, 236; 419/2, 38, 419/61, 66
See application file for complete search history.

(56) References Cited

U.S. PATENT DOCUMENTS

| 5,156,697 | A | * | 10/1992 | Bourell | .................. B22F 3/004 264/497 |
|---|---|---|---|---|---|
| 5,490,882 | A | | 2/1996 | Sachs et al. | |
| 5,490,962 | A | | 2/1996 | Cima et al. | |
| 5,518,680 | A | | 5/1996 | Cima et al. | |
| 5,660,621 | A | | 8/1997 | Bredt | |
| 5,775,402 | A | | 7/1998 | Sachs et al. | |
| 5,807,437 | A | | 9/1998 | Sachs et al. | |
| 5,814,161 | A | | 9/1998 | Sachs et al. | |
| 5,851,465 | A | | 12/1998 | Bredt | |
| 5,869,170 | A | | 2/1999 | Cima et al. | |
| 5,940,674 | A | | 8/1999 | Sachs et al. | |
| 6,036,777 | A | | 3/2000 | Sachs | |
| 6,070,973 | A | | 6/2000 | Sachs et al. | |

(Continued)

FOREIGN PATENT DOCUMENTS

WO     2009017648 A1    2/2009

*Primary Examiner* — Leo B Tentoni
(74) *Attorney, Agent, or Firm* — Philip D. Lane

(57) ABSTRACT

Methods are disclosed for making articles (2) by three-dimensional printing. The methods include three-dimensional printing a build powder mixture which includes a first material powder and a second material powder to form a printed article and subsequently heating the printed article to a temperature at which a sufficient amount of the second material powder melts to enable it to infiltrate throughout the interstices between the first material powder particles so that the article (2) achieves a room temperature relative density of at least 85 percent of its theoretical density, the theoretical density being the density the article (2) would have if it contained no porosity. The first material powder has a melting temperature, melting temperature range, or dissociation temperature which is higher than the melting temperature or melting temperature range of the second material powder and the first material powder has no more than a limited amount of solubility in the second material powder.

5 Claims, 2 Drawing Sheets

(56) References Cited

U.S. PATENT DOCUMENTS

| | | |
|---|---|---|
| 6,109,332 A | 8/2000 | Sachs et al. |
| 6,112,804 A | 9/2000 | Sachs et al. |
| 6,139,574 A | 10/2000 | Vacanti et al. |
| 6,146,567 A | 11/2000 | Sachs et al. |
| 6,176,874 B1 | 1/2001 | Vacanti et al. |
| 6,197,575 B1 | 3/2001 | Griffith et al. |
| 6,280,771 B1 | 8/2001 | Monkhouse et al. |
| 6,354,361 B1 | 3/2002 | Sachs et al. |
| 6,397,722 B1 | 6/2002 | Eddington |
| 6,454,811 B1 | 9/2002 | Sherwood et al. |
| 6,471,992 B1 | 10/2002 | Yoo et al. |
| 6,508,980 B1 | 1/2003 | Sachs et al. |
| 6,514,518 B2 | 2/2003 | Monkhouse et al. |
| 6,530,958 B1 | 3/2003 | Cima et al. |
| 6,585,930 B2 | 7/2003 | Liu et al. |
| 6,596,224 B1 | 7/2003 | Sachs et al. |
| 6,629,559 B2 | 10/2003 | Sachs et al. |
| 6,945,638 B2 | 9/2005 | Teung et al. |
| 7,077,334 B2 | 7/2006 | Sachs et al. |
| 7,250,134 B2 | 7/2007 | Keman et al. |
| 7,276,252 B2 | 10/2007 | Payumo et al. |
| 7,300,668 B2 | 11/2007 | Pryce Lewis et al. |
| 7,815,826 B2 | 10/2010 | Serdy et al. |
| 7,820,201 B2 | 10/2010 | Pryce Lewis et al. |
| 7,875,290 B2 | 1/2011 | Payumo et al. |
| 7,931,914 B2 | 4/2011 | Pryce Lewis et al. |
| 8,088,415 B2 | 1/2012 | Wang et al. |
| 8,211,226 B2 | 7/2012 | Bredt et al. |
| 8,465,777 B2 | 6/2013 | Wang et al. |
| 2002/0176793 A1 | 11/2002 | Moussa et al. |
| 2004/0009089 A1* | 1/2004 | Liu ............... B22F 1/0003 419/38 |
| 2004/0081573 A1 | 4/2004 | Newell |
| 2004/0140078 A1 | 7/2004 | Liu et al. |
| 2005/0080191 A1* | 4/2005 | Kramer ............ B29C 64/165 525/191 |
| 2006/0083652 A1 | 4/2006 | Liu et al. |
| 2008/0241404 A1 | 10/2008 | Allaman et al. |
| 2009/0321971 A1 | 12/2009 | Brodkin et al. |
| 2010/0044903 A1 | 2/2010 | Rhoades et al. |
| 2011/0217652 A1 | 9/2011 | Kittle |
| 2012/0231175 A1 | 9/2012 | Tan |
| 2016/0096224 A1* | 4/2016 | Demuth ............ B29C 64/165 419/53 |

\* cited by examiner

METHOD OF THREE-DIMENSIONAL PRINTING USING A MULTI-COMPONENT BUILD POWDER

RELATED APPLICATIONS

This patent application claims priority to U.S. Provisional Application Ser. No. 61/919,845, filed Dec. 23, 2013, and incorporates the provisional application by reference in its entirety.

BACKGROUND

1. Field of the Invention

The invention relates to methods for producing metallic articles by three-dimensional printing.

2. Background of the Invention

Three dimensional printing was developed in the 1990's at the Massachusetts Institute of Technology and is described in several United States patents, including the following U.S. Pat. No. 5,490,882 to Sachs et al., U.S. Pat. No. 5,490,962 to Cima et al., U.S. Pat. No. 5,518,680 to Cima et al., U.S. Pat. No. 5,660,621 to Bredt et al., U.S. Pat. No. 5,775,402 to Sachs et al., U.S. Pat. No. 5,807,437 to Sachs et al., U.S. Pat. No. 5,814,161 to Sachs et al., U.S. Pat. No. 5,851,465 to Bredt, U.S. Pat. No. 5,869,170 to Cima et al., U.S. Pat. No. 5,940,674 to Sachs et al., U.S. Pat. No. 6,036,777 to Sachs et al., U.S. Pat. No. 6,070,973 to Sachs et al., U.S. Pat. No. 6,109,332 to Sachs et al., U.S. Pat. No. 6,112,804 to Sachs et al., U.S. Pat. No. 6,139,574 to Vacanti et al., U.S. Pat. No. 6,146,567 to Sachs et al., U.S. Pat. No. 6,176,874 to Vacanti et al., U.S. Pat. No. 6,197,575 to Griffith et al., U.S. Pat. No. 6,280,771 to Monkhouse et al., U.S. Pat. No. 6,354,361 to Sachs et al., U.S. Pat. No. 6,397,722 to Sachs et al., U.S. Pat. No. 6,454,811 to Sherwood et al., U.S. Pat. No. 6,471,992 to Yoo et al., U.S. Pat. No. 6,508,980 to Sachs et al., U.S. Pat. No. 6,514,518 to Monkhouse et al., U.S. Pat. No. 6,530,958 to Cima et al., U.S. Pat. No. 6,596,224 to Sachs et al., U.S. Pat. No. 6,629,559 to Sachs et al., U.S. Pat. No. 6,945,638 to Teung et al., U.S. Pat. No. 7,077,334 to Sachs et al., U.S. Pat. No. 7,250,134 to Sachs et al., U.S. Pat. No. 7,276,252 to Payumo et al., U.S. Pat. No. 7,300,668 to Pryce et al., U.S. Pat. No. 7,815,826 to Serdy et al., U.S. Pat. No. 7,820,201 to Pryce et al., U.S. Pat. No. 7,875,290 to Payumo et al., U.S. Pat. No. 7,931,914 to Pryce et al., U.S. Pat. No. 8,088,415 to Wang et al., U.S. Pat. No. 8,211,226 to Bredt et al., and U.S. Pat. No. 8,465,777 to Wang et al.

In essence, three-dimensional printing involves the spreading of a layer of particulate material and then selectively jet-printing a fluid onto that layer to cause selected portions of the particulate layer to bind together. This sequence is repeated for additional layers until the desired part has been constructed. The material making up the particulate layer is often referred as the "build material" and the jetted fluid is often referred to as a "binder", or in some cases, an "activator". Post-processing of the three-dimensionally printed part is often required in order to strengthen and/or densify the part.

Various methods are used to supply each new powder layer for three-dimensional printing. For example, some three-dimensional printers have a powder reservoir box which contains powder supported upon a vertically indexable platform and use a counter-rotating roller to transfer a predetermined amount of powder from the top of the powder reservoir box to the top of a build box. Some other three-dimensional printers utilize a traveling dispenser to dispense each new layer of powder.

It is known to produce a dense part by using three-dimensional printing to create a particulate skeleton of a metal or metal alloy and then to infiltrating a metal or metal alloy into the porosity contained within that skeleton. For example, U.S. Pat. No. 5,775,402 to Sachs et al. discloses creating a stainless steel skeleton by three-dimensional printing an article from 50 micron diameter stainless steel build powder and then presintering the printed article. The presintered article is about 60% dense by volume. Bronze is then infiltrated into the stainless steel skeleton at 1100° C. using porous stainless steel stilts to conduct the molten bronze from a reservoir up into the stainless steel skeleton. The ability of the bronze to dissolve the stainless steel is satisfied by erosion of the stilts. U.S. Pat. No. 6,585,930 B2 to Liu et al. describes the use of a one-step infiltration method in which a single heat treatment is used to sinter and infiltrate the three-dimensionally printed article.

Despite its advantages, the aforementioned prior art method of infiltrating a metal skeleton to create a dense article has its drawbacks. Among these disadvantages are the necessities of providing a reservoir of the infiltrant and of providing a stilting configuration to conduct the infiltrant from the reservoir to the metal skeleton. The use of stilting results in a significant amount of work. The work includes designing and creating the stilts and the reservoirs, setting up the stilts and filling the reservoirs, connecting the article or articles to the stilts, cutting the infiltrated articles away from the stilts, scrapping the stilts, and surface conditioning the articles to eliminate the stilts stubs that remain attached to articles and to blend these attachment areas into the articles' contours. The use of stilts also results in a large amount of scrap generation. For small articles, the weight of the amount of scrapped stilts can exceed that of the articles, even when a large number of articles are processed at the same time. The use of stilts also impacts on the size and type of furnace for infiltrating the printed article into a dense article.

SUMMARY OF THE PRESENT INVENTION

The present invention provides methods of producing dense three-dimensionally printed articles in manners which overcome the aforementioned disadvantages of the prior art. The methods of the present invention utilize a multiple-component build powder which is used to three-dimensionally print the article. This multiple-component build powder comprises a mixture of a first material powder and a second material powder. The first material powder has a melting temperature, melting temperature range, or dissociation temperature which is higher than the melting temperature or melting temperature range of the second material powder and the first material powder has no more than a limited amount of solubility in the second material powder. The methods of the present invention comprise using the multiple-component build powder to three-dimensionally print an article of a desired geometry and heating the printed article to a temperature at which a sufficient amount of the second material powder melts to enable it to infiltrate throughout the interstices between the first material powder particles so that the article achieves a room temperature relative density of at least 85 percent of its theoretical density, the theoretical density being the density the article would have if it contained no porosity.

BRIEF DESCRIPTION OF THE DRAWINGS

The criticality of the features and merits of the present invention will be better understood by reference to the attached drawings. It is to be understood, however, that the drawings are designed for the purpose of illustration only and not as a definition of the limits of the present invention.

DESCRIPTION OF PREFERRED EMBODIMENTS

Figure 1:
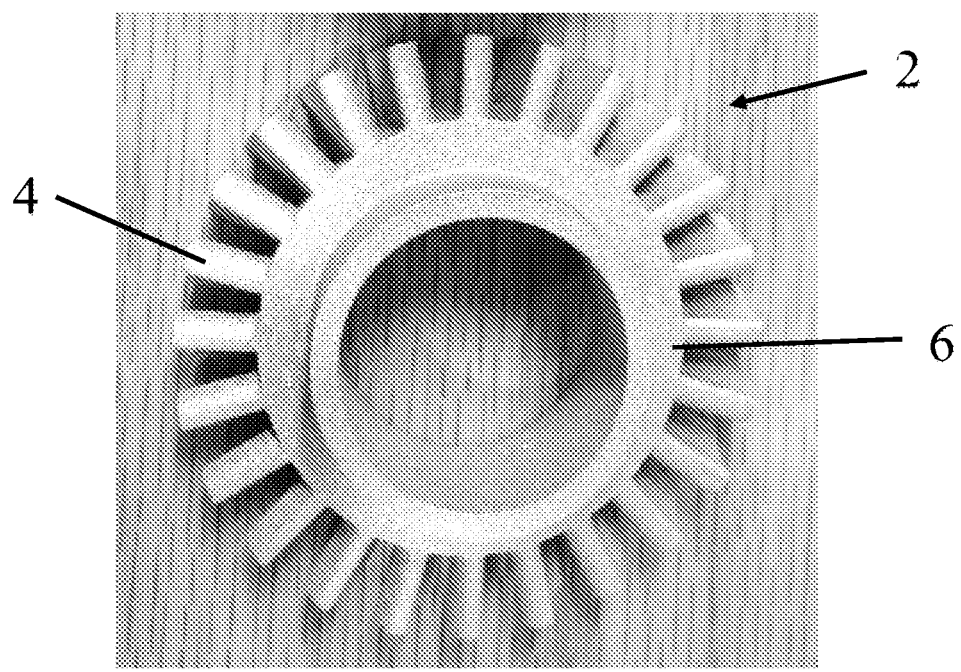
FIG. 1 is a photograph of the fully dense impeller of Example 1 in accordance with an embodiment of the present invention.

In this section, some preferred embodiments of the present invention are described in detail sufficient for one skilled in the art to practice the present invention without undue experimentation. It is to be understood, however, that the fact that a limited number of preferred embodiments are described herein does not in any way limit the scope of the present invention as set forth in the appended claims. It is to be understood that whenever a range of values is described herein or in the appended claims that the range includes the end points and every point therebetween as if each and every such point had been expressly described. Unless otherwise stated, the word "about" as used herein and in the appended claims is to be construed as meaning the normal measuring and/or fabrication limitations related to the value which the word "about" modifies. Unless expressly stated otherwise, the term "embodiment" is used herein to mean an embodiment of the present invention.

The methods of the present invention comprise a step of three dimensional printing a multi-component build powder, i.e. a build powder mixture, which comprises a first material powder and a second material powder to form a printed article and subsequently heating the printed article to a temperature at which a sufficient amount of the second material powder melts to enable it to infiltrate throughout the interstices between the first material powder particles so that the article achieves a room temperature relative density of at least 85 percent of its theoretical density, the theoretical density being the density the article would have if it contained no porosity. The first material powder has a melting temperature, melting temperature range, or dissociation temperature which is higher than the melting temperature or melting temperature range of the second material powder and the first material powder has no more than a limited amount of solubility in the second material powder.

The phrase "limited amount of solubility" is to be construed as meaning that the amount of dissolution of the first material powder in the second material powder at the preselected infiltration temperature is insufficient to reduce the diameter of a particle of the first material powder which had a starting diameter of about that of the mean diameter of the first material powder by more than about 25 percent during the infiltration heat treatment of the inventive process. For example, if the first material powder has a mean diameter of 50 microns, then the first material powder would be said to have a limited amount of solubility in the second material powder if the diameter of a first material powder particle having an initial diameter of 50 microns has a diameter of no less than 37.5 microns after the infiltration heat treatment.

The mean powder size and the particle size distribution of the first material powder and the second material powder are selected to be compatible with the three-dimensional printing process. The mixture comprising the first material powder and the second material powder may be prepared by any means known in the art for mixing powders to achieve a compositionally homogeneous mixture. In order to obtain a homogenous mixture, care must be taken in preparing the mixture when the first material powder and second material powder differ in density or particle size by more than about fifteen percent. A level of homogeneity sufficient to result in the printed part having substantially the same distribution of the first material powder and the second material powder on each printed layer is preferred.

The composition of a particular build powder mixture in terms of the relative amounts of the first material powder and the second material powder is chosen such that the amount of second material powder is just sufficient to fully infiltrate interstices the first material powder taking into consideration any dissolution that may occur of one of these materials by the other. Preferably, the volume portion of the first material powder in the build powder mixture is in the range of about 50% to about 95%, and more preferably in the range of about 50% to about 85%.

The compositions of the first material powder and the second material powder are chosen to provide the article with the desired physical properties while taking into consideration that these materials must also be compatible with the three-dimensional printing process and the heat treatment process that will transform the printed article into the dense article. The first material powder is selected so as to have a melting temperature, a melting temperature range, or a dissociation temperature that is above the melting temperature or the melting temperature range of the second material powder. The second material powder is selected such that it is capable of infiltrating into the interparticle interstices between the first material powder particles at a preselected temperature or temperature range so that the article achieves a room temperature relative density of at least 85 percent of its theoretical density. The first material powder may be a ceramic, metal, or metal alloy. The second material powder may be a metal or metal alloy. For example, in one embodiment, the first material powder is a stainless steel and the second material powder is a bronze. In another embodiment, the first material powder is a copper and the second material powder is a bronze.

EXAMPLES

Example 1

A 420 grade stainless steel powder was selected for use as a first material powder and a bronze powder (90 weight percent copper and 10 weight percent tin) was selected for use as a second material powder. The first material powder had a mean particle size of about 30 microns and the second material powder had a mean particle size of about 30 microns. A build powder mixture was created by blending together 70 volume percent of the first material powder with 30 volume percent of the second material powder. The blending was done using a Turbula mixer model number T2F available from Glen Mills Inc, Clifton, N.J. 07014 United States in which 1.4 liter batches of the components were mixed for 30 minutes each in a 2 liter mixing container.

An impeller design was chosen as the article to be made. The fully dense impeller 2 after heat treatment made in this example is shown in FIG. 1. The impeller 2 has a plurality of fins 4 attached to a hub 6. The internal diameter of the hub 6 is about 3.909 centimeters. A R2 model three-dimensional printing machine available from The ExOne Company, North Huntingdon, Pa. 15642 US was used to create the printed impeller using a layer thickness of about 0.010 centimeters and a polymer-based binder selectively jetted onto the build powder mixture. After building was completed, the build box containing the printed impeller was heated to approximately 190° C. to cure the binder. The printed impeller was then heat treated in a batch furnace in a Nitrogen atmosphere during which the impeller was heated at a rate of 5° C./minute and held for 3 hours at 1100° C. and then cooled to room temperature.

The density of the heat treated impeller was measured using the Archimedes method to be 89%.

Example 2

Figure 2:
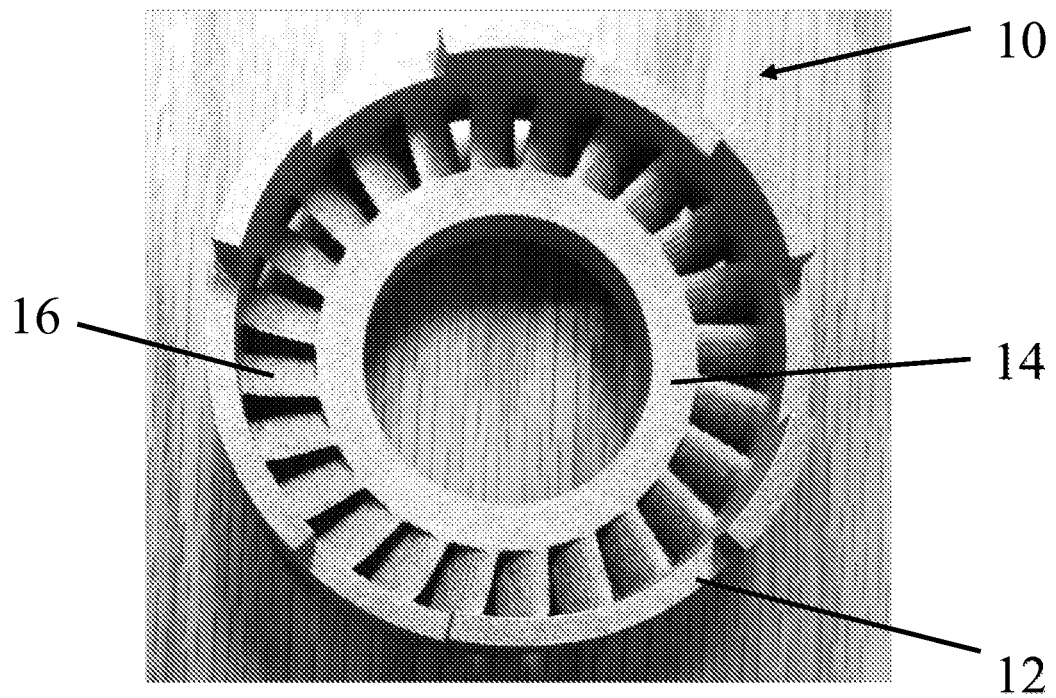
FIG. 2 is a photograph of the fully dense stator of Example 2 in accordance with an embodiment of the present invention.

A stator design was chosen as the article to be made. The fully dense stator 10 after heat treatment made in this example is shown in FIG. 2. The stator 10 is designed to work in combination with the rotor 2 of Example 1. The stator 10 has an outer ring 12 connected to an inner hub 14 by a plurality of fins 16. The internal diameter of the hub 14 is about 4.712 centimeters. The stator was processed as described in Example 1. The density of the heat treated stator was measured using the Archimedes method to be 89%.

Example 3

Four tensile test bars were chosen as the articles to be made. Each of the bars was approximately 15.24 centimeters long and 1.27 centimeters in diameter. These bars, Samples A-D, were processed as described in Example 1, except that two of the bars, Samples C and D, were heat treated at a hold temperature of 1100° C. The bars were then tensile tested and the measured properties are reported in Table 1.

TABLE 1

| Sample ID | Infiltration Temperature (° C.) | 0.2% Yield Strength (MPa) | Ultimate Tensile Strength (MPa) | Elongation (%) | Elastic Modulus (MPa) |
|---|---|---|---|---|---|
| A | 1140 | 278 | 362 | 0.9 | 94,458 |
| B | 1140 | 261 | 332 | 0.9 | 93,079 |
| C | 1100 | 169 | 202 | 0.7 | 62,053 |
| D | 1100 | 177 | 214 | 0.8 | 63,432 |

Example 4

Figure 3:
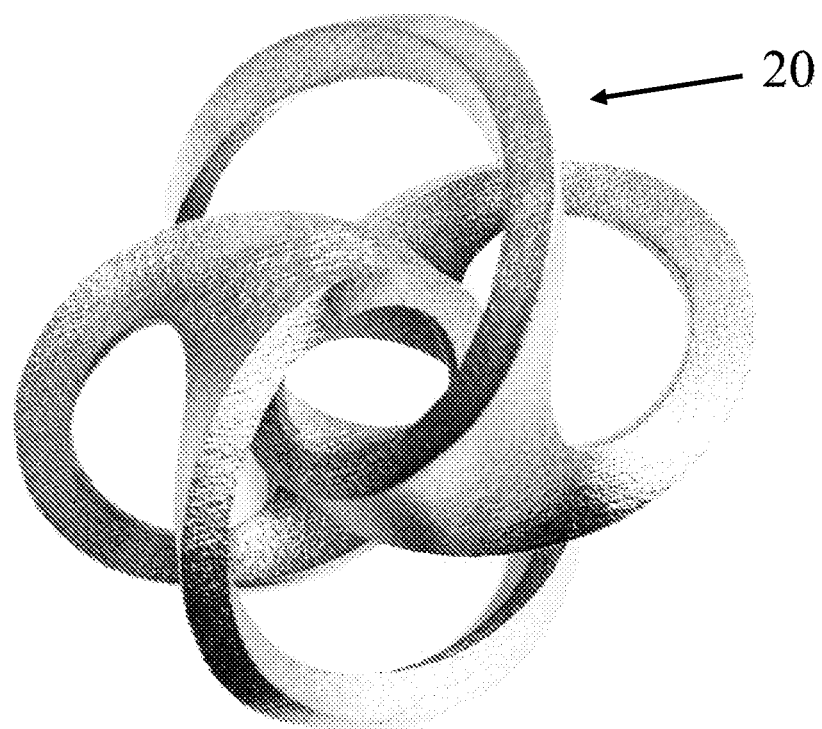
FIG. 3 is a photograph of the fully dense art object of Example 4 in accordance with an embodiment of the present invention.

A Mobius strip-like art object was chosen as the article to be made. The fully dense art object 20 after heat treatment made in this example is shown in FIG. 3. The art object 20 has a diameter of about 8.89 centimeters. The art object was processed as described in Example 1, except that the heat treatment was done in a continuous furnace using a belt speed of about 13 centimeters per minute and a peak temperature of 1115° C. with a time at the peak temperature of 30 minutes and the atmosphere at the peak temperature being a flowing gas mixture of 87 volume percent nitrogen and 13 volume percent hydrogen. The density of the heat treated art object was measured using the Archimedes method to be 88%.

Example 5

Figure 4:
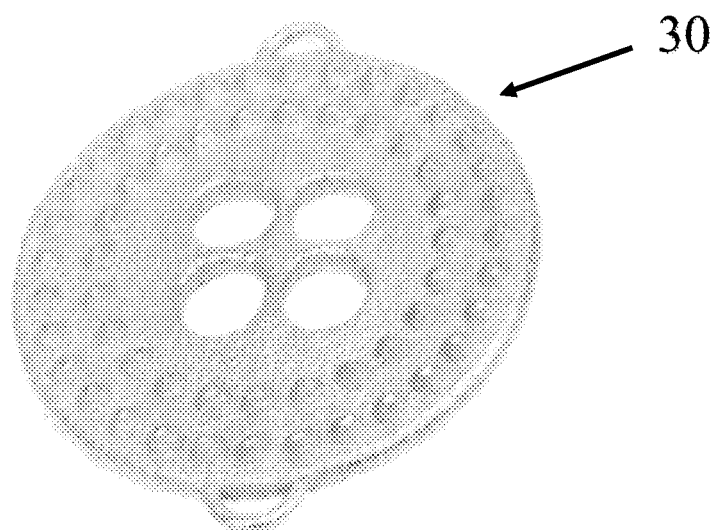
FIG. 4 is a photograph of the fully dense medallion of Example 5 in accordance with an embodiment of the present invention.

A medallion was chosen as the article to be made. The fully dense medallion 30 after heat treatment made in this example is shown FIG. 4. The medallion 30 has a diameter of about 3.0 centimeters. The medallion was processed as described in Example 4, except after heat treatment, its surface was plated with gold. The density of the heat treated medallion was measured using the Archimedes method to be 88%.

While only a few embodiments of the present invention have been shown and described, it will be obvious to those skilled in the art that many changes and modifications may be made thereunto without departing from the spirit and scope of the invention as described in the following claims. All United States patents and patent applications, all foreign patents and patent applications, and all other documents identified herein are incorporated herein by reference as if set forth in full herein to the full extent permitted under the law.

What is claimed is:

1. A process for making an article comprising the steps of:
   a) providing a build powder mixture comprising a first material powder in an amount of between 50 and 95 volume percent and a second material powder, the first material powder having one selected from the group consisting of a melting temperature, a melting temperature range, and a decomposition temperature, and the second material powder having one selected from the group consisting of a melting temperature and a melting temperature range, wherein the melting temperature or the melting temperature range of the second material powder is less than the melting temperature, the melting temperature range, or the dissociation temperature of the first material powder;
   b) three-dimensionally printing the article from the build powder mixture by spreading a layer of the build powder mixture, selectively jet-printing a fluid onto the layer to cause selected portions of the layer to bind together, and repeating the sequence of spreading and selectively jet-printing until the article has been constructed; and
   c) heating the printed article to a preselected temperature, the preselected temperature being above the melting temperature or within or above the melting temperature range of the second build powder material and below the melting temperature, the melting temperature range, or the dissociation temperature of the first material powder; and
   d) maintaining the printed article at the preselected temperature until the second material powder has infiltrated through the spaces between individual particles of the first material powder so that the article has a relative density at room temperature of at least 85%, wherein:
   the amount of dissolution of the first material powder in the second material powder during step (d) is insufficient to reduce the diameter of a particle of the first material powder which had a starting diameter of the mean diameter of the first material powder by more than 25 percent.

2. The process of claim 1, wherein the first material powder is a metal or a metal alloy.

3. The process of claim 1, wherein the first material powder is a ceramic.

4. The process of claim 1, wherein the second material powder is a metal alloy.

5. The process of claim 1, wherein the first material powder is a stainless steel alloy.

\* \* \* \* \*